United States Patent [19]

Stewart et al.

[11] 4,189,865
[45] Feb. 26, 1980

[54] PROCESS FOR GROWING SPROUTS

[76] Inventors: William F. Stewart, 3814 NW. 122nd St., Vancouver, Wash. 98665; Charles W. Baldwin, 7805 NE. 27th St., Vancouver, Wash. 98662

[21] Appl. No.: 948,828

[22] Filed: Oct. 5, 1978

[51] Int. Cl.$^2$ .............................................. A01G 31/02
[52] U.S. Cl. ....................................................... 47/14
[58] Field of Search ........................ 47/14, 16, 59–62

[56] References Cited

U.S. PATENT DOCUMENTS

| | | | |
|---|---|---|---|
| 2,736,643 | 2/1956 | Pentler et al. | 47/14 X |
| 2,750,713 | 6/1956 | Chin | 47/14 |
| 3,717,085 | 2/1973 | Sato | 47/61 X |
| 3,943,658 | 3/1976 | Wong Han Hai | 47/16 X |
| 3,945,148 | 3/1976 | Oyama | 47/14 |
| 4,086,725 | 5/1978 | Kwang Li | 47/61 |
| 4,114,315 | 9/1978 | Rinella | 47/61 |
| 4,144,671 | 3/1979 | Lee | 47/14 |

Primary Examiner—Robert E. Bagwill
Attorney, Agent, or Firm—Chernoff & Vilhauer

[57] ABSTRACT

Process for growing sprouts from seeds comprises circulating the water in which the seeds are germinated continuously for 8 hours so that the seeds are continually germinating in fresh water. The germinated sprouts are then repeatedly allowed to drain and stand for approximately 4–8 hours and then soaked for approximately 15 minutes. For the first 48 hours the sprouts are lightly worked during the soakings by being separated by the user's fingers. Between 48 and 72 hours the sprouts are heavily worked and are submerged during the soaking cycle, and the floating husks are removed from the container in which the sprouts are soaked by skimming the container while the sprouts are submerged. Between 72 and 144 hours, in addition to the skimming, after each soaking the sprouts are removed from the container and the container cleaned. Also after 72 hours and 96 hours the sprouts in each container are split in approximately equal portions and each of the portions are placed in separate containers. Therefore, the sprouts germinated in a single container ultimately fills four containers by the time the sprouts are ready for harvesting so that the depth of the sprouts growing in a container remains relatively constant.

13 Claims, 1 Drawing Figure

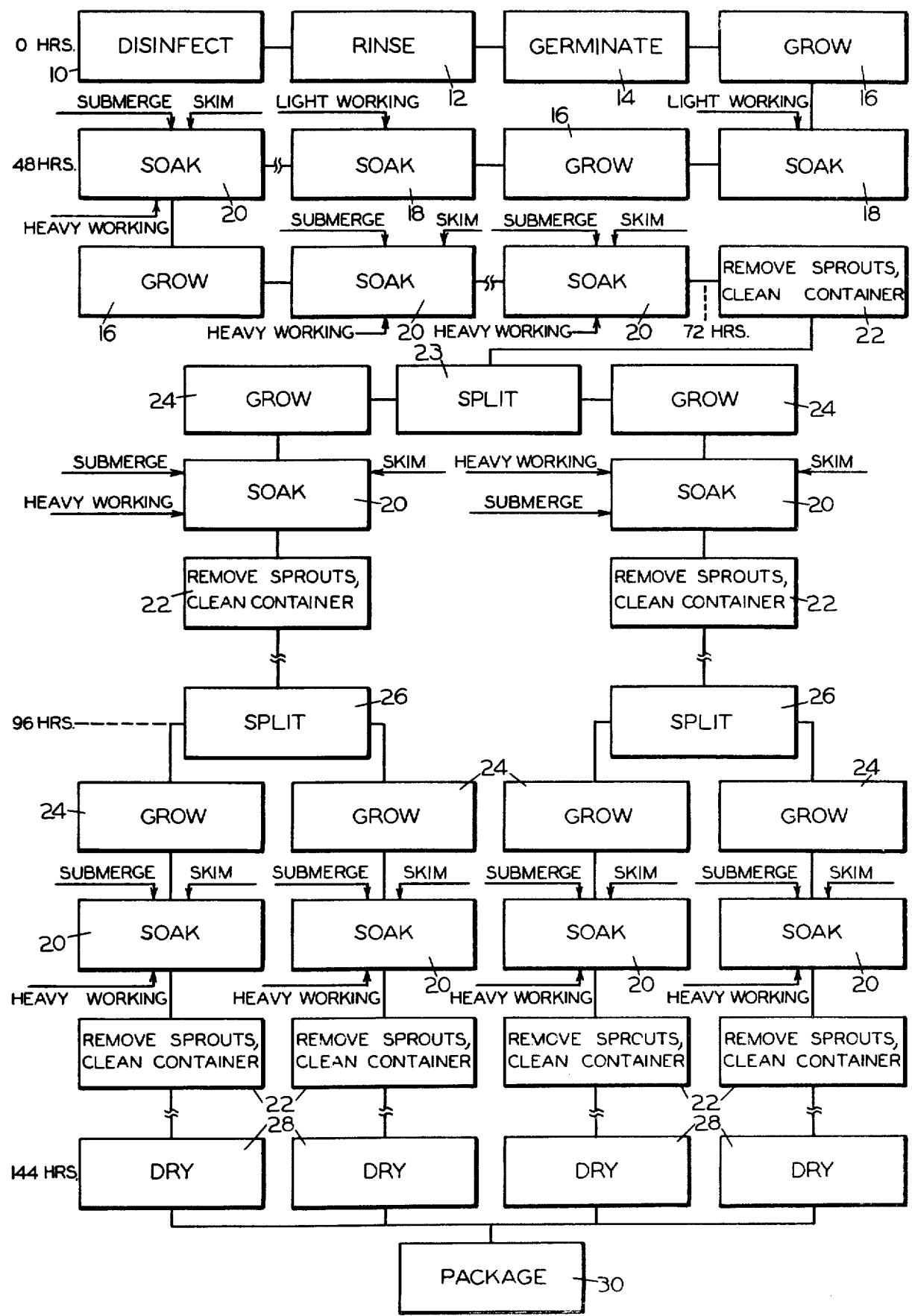

PROCESS FOR GROWING SPROUTS

BACKGROUND OF THE INVENTION

This invention relates to a process for growing sprouts, and in particular to such a process whereby the sprouts have a longer shelf life and are more tasty.

In the past sprouts of various grains, such as alfalfa, have been widely grown as a food source due to their high nutritional value. Typically, the process for growing the sprouts is to germinate seeds by soaking them overnight and thereafter placing the germinated sprouts in a container where they are periodically watered until they grow to the desired size. While refined processes have been developed for large scale production of sprouts, this basic growing procedure is still followed.

However, the husks of sprout seeds contain a toxin that is released when the seeds are soaked which is quite bitter to the taste. In addition, if the husks remain in water for an extended period of time, they start to decay and as a result promote and harbor to growth of bacteria. Heretofore the husks are left to remain with the sprouts and are continuously soaked in the water which nourishes them so that the sprouts also acquire the bitter taste of the toxin which has come to characterize them, and the resulting bacteria adversly effects their freshness. Also, since it would be extremely expensive to remove the husks once they have become interwoven in the mat which the growing sprouts create, the husks are harvested along with the sprouts which detracts from the aesthetic appeal of the sprouts and further embitter their taste.

In addition, the prior art processes for growing sprouts do not provide the necessary steps for sufficiently retarding that bacteria growth which is initiated. Therefore, the stems of the sprouts spoil prematurely which severly limit their self life. As a result of both of the foregoing limitations of the prior art processes for growing sprouts, the market for sprouts has not been widely developed, even though they contain a great amount of nutritional value.

The process of the present invention on the other hand, allows for systematic removal of the husks throughout the growing process so that the toxin generated by them is not absorbed by the sprouts, bacteria growth is minimized and the resulting sprouts are relatively free of the husks thereby providing a much more aesthetically pleasing appearance. In addition it provides periodic soaks in cool water to retard any bacteria growth which does occur in the sprouts which serves to maintain their freshness and provide long shelf life.

The process comprises continually circulating fresh water through the seeds during the germination process to flush the toxin out of the container in which germination takes place before it can be absorbed by the sprouts. Thereafter the sprouts undergo periodic cool water soakings and growing periods with measures being taken during the soakings to prevent the sprouts from becoming matted and to remove the husks from the container in which the sprouts are growing. Throughout each soaking in the first portion of the process (up to 48 hours), the sprouts are lightly worked by the operator's hands to prevent matting and to remove the husks. During the middle portion of the process (48 to 72 hours), the sprouts are heavily worked during each soaking and are also submerged thereby allowing the husks to float to the surface where they are removed by skimming the container. During the latter part of the process (from 72 hours on), after every soaking, which also includes heavy working, submerging and skimming, the sprouts are removed from the container and the container is cleaned. After approximately 144 hours the sprouts are fully grown and are allowed to dry before being packaged.

In order to maintain a nearly constant volume of sprouts in the container, the sprouts are progressively split into two parts and each part placed into separate containers after 72 and 96 hours.

Accordingly, it is a principal object of the present invention to provide a method for growing sprouts whereby the toxin which is produced by the seed husks is continually removed before it can adversely affect the taste of the sprouts.

It is a further object of the present invention to provide such a process whereby the husks also are periodically removed from the sprouts.

It is a still further object of the present invention wherein the sprouts are prevented from becoming tightly matted as they grow.

It is a yet further object of the present invention to provide such a process wherein progressive soaking and growing periods are timed so as to provide fresh long lived sprouts upon harvest.

It is a still further object of the present invention to provide such a process which is arranged for growing a large number of sprouts in an efficient manner whereby labor demands are compressed into short predictable segments thereby reducing labor costs.

The foregoing objectives, features and advantages of the present invention will be more readily understood upon consideration of the following detailed description of the invention taken in conjunction with the accompanying drawing.

BRIEF DESCRIPTION OF THE DRAWING

The single FIGURE is a schematic flow diagram showing the process of the present invention.

DETAILED DESCRIPTION OF THE INVENTION

Referring to the FIGURE the present invention provides an improved process for growing sprouts from seed. While the time intervals shown and described are particularly applicable to alfalfa sprouts, the basic principles taught by the invention also apply to other types of sprouts.

The seeds are first disinfected 10 by submerging them in a 10–1 solution of 5.75% chlorine bleach. As a result, any bacteria or fungus on the seeds is killed so that the sprouts will not become contaminated by it. While the particular time of submerging is not critical, it has been found that 3–5 minutes serves to kill most bacteria and fungus without any appreciable absorption of chlorine into the seeds.

After disinfecting, residual chlorine is removed from the seeds by rinsing 12. Again, while the rinse time is not critical, it has been found that three rinses in fresh water with the seeds being agitated during each rinsing, effectively removes any chlorine residual.

After rinsing the seeds to remove the residual chlorine, the seeds are germinated 14 by soaking them in a suitable sized container. It has been found that the ideal sized container is one which will accommodate approximately 100 pounds of sprouts, and it is desirable that approximately this volume of sprouts be maintained throughout the growing cycle. Accordingly, assuming 10–1 germination, 40 pounds of seeds, which will provide 100 pounds of small sprouts upon germination, is placed in each container; although this amount of sprouts will ultimately grow to weight 400 pounds by the time they are harvested. Therefore, to maintain the 100 pound weight, the sprouts must be periodically divided as will be more fully explained later.

In order to fully germinate, the seeds should sit in the water for approximately 8 hours. However, when the seeds are soaked a toxin is released from the husks into the water and if the sprouts are left in the water the bitter taste of the toxin is imparted to them. Therefore, the water used for germination is circulated by continuously draining water from the container and adding fresh water to it.

After germination the container is drained and the sprouts allowed to grow 16 as they gradually dry. In order to prevent the loss of any ungerminated seeds or small sprouts, the drain is covered by a fine mesh drain screen (not shown). However, in approximately 4–8 hours, before the sprouts become fully dry, the container is again filled with water and the sprouts are allowed to soak for approximately 15 minutes. In addition to irrigating the sprouts, if the temperature of the water is low enough to cool the mass of sprouts below 48°, the soaking also serves to retard any bacteria growing in the sprouts. As the sprouts are soaked an operator gently works them by running his hand through them thereby separating the sprouts and preventing them from becoming matted. As a result, when the sprouts mature to the stage where the husks are released, the husks are free to separate from the sprouts rather than becoming entangled within the mat. After soaking the water is again emptied from the container and the sprouts allowed to grow for another 4–8 hours as they dry.

Soaking and growing are then cyclically repeated until the process has been in progress for approximately 48 hours. Thereafter during all the following soakings the sprouts are worked much more vigorously to ensure separation of the sprouts and to dislodge the husks, which by this time are readily falling off. In addition, during the remaining soakings the sprouts are submerged thereby allowing the husks to float to the surface where they are removed by skimming the container. Accordingly, the husks are not allowed to decay and thus promote bacteria which would otherwise effect the freshness of the sprouts. The modified soaking and growing cycles are then repeated up to an elasped time of 72 hours. At this time after each soaking the sprouts are removed from the container and it is drained and cleaned. In addition, after 72 hours the drain screen is replaced with one having a larger mesh so that ungerminated seed and under developed sprouts will be removed with the water upon draining. The sprouts, which now have approximately doubled in volume (i.e. 200 pounds of sprouts are provided from the original 40 pounds of seed), are divided in half 23 and each of the halves is placed in a separate clean container which is filled with fresh water and allowed to grow 24. Otherwise the increased volume of the sprouts causes their height in the container to increase past the point where rapid growth is obtained. It has been found that the maximum depth which the sprouts should be allowed to reach is 6–8 inches.

At the end of the next 4–8 hour growing cycle, the sprouts again undergo a 15 minute soaking which includes heavy working, submersion and skimming. Thereafter the sprouts are again removed from the containers and the containers are cleaned. The growing, soaking and cleaning is repeated until the sprouts again double in volume, after approximately 96 hours. The sprouts then are split again 26, this time into four containers, where they again undergo repeated growing 24, soaking 20 and cleaning 22 until they are ready to be harvested, which typically occurs at approximately 144 hours. The containers are then drained and the sprouts allowed to surface dry 28. After the sprouts have surface dried they are packaged 30 and shipped to market.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. The method of growing sprouts from seeds comprising:
   (a) germinating the seeds into sprouts by submerging them in water until said seeds have germinated;
   (b) circulating said water continuously so that said water is constantly being replaced by fresh water;
   (c) draining the sprouts and thereafter allowing them to stand for a predetermined time interval;
   (d) soaking the sprouts in fresh water for a time less than said predetermined time interval;
   (e) draining said water from the sprouts and thereafter allowing them to again stand for said predetermined time interval; and
   (f) cyclically repeating steps d and e until the sprouts have matured to the desired degree.

2. The method of growing sprouts from seeds comprising:
   (a) germinating the seeds into sprouts by submerging them in water for approximately 7–9 hours;
   (b) circulating said water continuously so that said water is constantly being replaced by fresh water;
   (c) draining the sprouts and thereafter allowing them to stand for approximately 4–8 hours;
   (d) soaking the sprouts in fresh water for approximately 15 minutes;
   (e) draining said water from the sprouts, allowing them to stand for approximately 4–8 hours; and
   (f) cyclically repeating steps d and e until the sprouts have matured to the desired degree.

3. Method of growing sprouts from seeds comprising:
   (a) germinating the seeds into sprouts by submerging them in water in a container for approximately 7–9 hours;
   (b) circulating said water in said container continuously so that said water is constantly being replaced by fresh water;
   (c) draining the sprouts for 4–8 hours after removing the water from said container;
   (d) soaking the sprouts in said container in fresh water for approximately 15 minutes;
   (e) draining the sprouts for approximately 4–8 hours after removing the water from said container; and
   (f) cyclically repeating steps d and e until the sprouts have matured to the desired degree.

4. The process of claim 3 including, before step a, the step of disinfecting the seeds by submerging them in a diluted chlorine solution for approximately 3–5 minutes.

5. The process of claim 4 wherein said chlorine solution contains approximately 0.5% chlorine bleach.

6. The process of claim 4 including the further step of rinsing and agitating the seeds three times in a water bath after disinfecting to remove the residual chlorine from the seeds.

7. The process of claim 3 wherein during every soaking the sprouts are worked to prevent them from becoming intergrown and matted.

8. The process of claim 3 where every soaking after the process has progressed for approximately 48 hours is followed by the step of submerging the sprouts in the container and skimming the container to remove the husks which fall from the seeds after germination.

9. The process of claim 3 where every soaking after the process has progressed for a predetermined time is followed by the step of submerging the sprouts in the container and skimming the container to remove the husks which fall from the seeds after germination.

10. The process of claim 3 wherein after the process has progressed for approximately 72 hours, every soaking is followed by the step of removing the sprouts from the container, cleaning the container and thereafter placing the sprouts back into the container.

11. The process of claim 3 wherein after the process has progressed for a predetermined time, every soaking is followed by the step of removing the sprouts from the container, cleaning the container and thereafter placing the sprouts back into the container.

12. The process of claim 3 including, after the process has progressed for approximately 72 hours and 96 hours, the step of dividing the sprouts in each container into approximately equal portions and placing each of said portions in a separate container.

13. The process of claim 3 including after step f the additional step of drying the sprouts and thereafter packaging them.

* * * * *